US010082158B2

United States Patent
Ruopp

(10) Patent No.: US 10,082,158 B2
(45) Date of Patent: Sep. 25, 2018

(54) MASTER CYLINDER FITTING

(71) Applicant: Gustav Magenwirth GmbH & Co., Bad Urach (DE)

(72) Inventor: Michael Ruopp, Berghülen (DE)

(73) Assignee: Gustav Magenwirth GmbH & Co. KG (DE)

( * ) Notice: Subject to any disclaimer, the term of this patent is extended or adjusted under 35 U.S.C. 154(b) by 198 days.

(21) Appl. No.: 15/054,216

(22) Filed: Feb. 26, 2016

(65) Prior Publication Data

US 2016/0177976 A1  Jun. 23, 2016

Related U.S. Application Data

(63) Continuation of application No. PCT/EP2014/068002, filed on Aug. 25, 2014.

(30) Foreign Application Priority Data

Aug. 27, 2013 (DE) .......... 10 2013 217 056
Dec. 20, 2013 (DE) .......... 10 2013 227 027
Feb. 25, 2014 (DE) .......... 10 2014 203 399

(51) Int. Cl.
*B60T 11/16* (2006.01)
*F15B 7/08* (2006.01)
(Continued)

(52) U.S. Cl.
CPC ............. *F15B 7/08* (2013.01); *B60T 11/16* (2013.01); *B60T 11/232* (2013.01); *B62K 23/06* (2013.01); *B62L 3/023* (2013.01)

(58) Field of Classification Search
CPC ........ B60T 11/16; B60T 11/22; B60T 11/232; B62K 23/06; B62L 3/023; F15B 7/08
See application file for complete search history.

(56) References Cited

U.S. PATENT DOCUMENTS 7,530,435 B2 * 5/2009 Lumpkin ............... B60T 7/102
188/344
2003/0121262 A1 7/2003 Lumpkin
(Continued)

FOREIGN PATENT DOCUMENTS

DE  3312192 A1  10/1984
DE  19907298 B4  8/2000
(Continued)

OTHER PUBLICATIONS

Office Action from Taiwanese Patent App. No. 103129314 dated Jul. 13, 2017.
(Continued)

*Primary Examiner* — Michael Leslie
*Assistant Examiner* — Abiy Teka
(74) *Attorney, Agent, or Firm* — Mayback & Hoffman, P.A.; Gregory L. Mayback

(57) ABSTRACT

A master mounting for a hydraulic actuation member has a housing, which has a compensating chamber with an interior and a cylinder. The master mounting also has a piston guided in the cylinder. The cylinder and the compensating chamber are connected in at least one position of the piston by a communication channel. At least one overflow channel is disposed at least at the opening of the communication channel in the cylinder wall.

19 Claims, 8 Drawing Sheets

(51) Int. Cl.
*B60T 11/232* (2006.01)
*B62L 3/02* (2006.01)
*B62K 23/06* (2006.01)

(56) References Cited

U.S. PATENT DOCUMENTS

| | | | |
|---|---|---|---|
| 2007/0215417 A1* | 9/2007 | Chen | B62L 3/023 |
| | | | 188/24.22 |
| 2008/0011566 A1 | 1/2008 | Campbell | |
| 2012/0152673 A1 | 6/2012 | Wang | |

FOREIGN PATENT DOCUMENTS

| | | | | |
|---|---|---|---|---|
| DE | 69827145 T2 | 10/2005 | | |
| DE | 102006036415 A1 * | 2/2008 | | B60T 17/22 |
| DE | 102006040328 A1 | 3/2008 | | |
| DE | 102007040364 A1 | 3/2009 | | |
| DE | 102010040045 A1 | 3/2012 | | |
| EP | 2520479 A2 | 11/2012 | | |
| TW | 201033077 A * | 9/2010 | | |
| TW | I426034 B | 2/2014 | | |
| TW | I471248 B | 2/2015 | | |
| WO | 2015028429 A2 | 3/2015 | | |
| WO | 2015028429 A3 | 3/2015 | | |

OTHER PUBLICATIONS

Office Action from Taiwanese Patent App. No. 103129314 dated Mar. 31, 2018.

* cited by examiner

MASTER CYLINDER FITTING

CROSS-REFERENCE TO RELATED APPLICATIONS

This is a continuing application, under 35 U.S.C. § 120, of copending international application No. PCT/EP2014/068002, filed Aug. 25, 2014, which designated the United States and was not published in English; this application also claims the priority, under 35 U.S.C. § 119, of German patent application Nos. 10 2013 217 056.4, filed on Aug. 27, 2013, 10 2013 227 027.5, filed on Dec. 20, 2013, and 10 2014 203 399.3, filed on Feb. 25, 2014, the prior applications are herewith incorporated by reference in their entireties.

STATEMENT REGARDING FEDERALLY SPONSORED RESEARCH OR DEVELOPMENT

Not Applicable

FIELD OF THE INVENTION

The invention relates to a master mounting for a hydraulic actuation member having a cylinder and a piston guided in the cylinder. Master mountings of the above-mentioned type can be used for hydraulic brakes or clutch actuations, for example.

BACKGROUND OF THE INVENTION

Disk brakes for vehicles steered by handlebars, e.g. bicycles, are known from practice. These known disk brakes have a master mounting that is attached to the handlebar and usually has a compensating chamber for a hydraulic medium. The compensating chamber is in contact with the cylinder of a piston-cylinder pairing, and, therefore, hydraulic medium can flow in from the compensating chamber with increasing brake pad wear. It is also possible to compensate for changes in volume which are caused by temperature fluctuations and can occur on account of the weather or during long braking operations, for example. The hydraulic medium in the cylinder can be pressurized by the piston. When the piston moves, a gasket attached to the piston travels over the connecting opening to the compensating chamber, and, therefore, upon actuation of the brake, the hydraulic system is closed and the pressure that builds upon actuation of the master mounting is not relieved through the compensating chamber. A hydraulic line borders on the cylinder and transmits the actuation force to the slave cylinder of the brake or of a clutch actuation.

These known master mountings have the drawback that during the production the final assembly is comparatively complex and the master mounting has a rather elongated design along the cylinder axis. In particular in radial mountings where the cylinder axis extends perpendicularly to the handlebar axis, this leads to a large available space and, as a result, to a comparatively long distance between handlebar tube and hand lever, and, therefore, the operation can be limited for persons having small hands.

Thus, a need exists to overcome the problems with the prior art systems, designs, and processes as discussed above.

SUMMARY OF THE INVENTION

The systems and methods described provide a master mounting for a hydraulic actuation member that overcomes the hereinafore-mentioned disadvantages of the heretofore-known devices and methods of this general type and that provide such features with ease of mounting and ease of production as well as having compact dimensions.

The invention proposes to use a hydraulic actuation member for a vehicle steered by handlebars. The actuation member can be, in particular, a disk or rim brake or a hydraulic clutch actuation. In any case, the actuation member has a slave cylinder to which a hydraulic fluid is applied. As a result, a piston moves in the cylinder and carries out the desired function, e.g., forcing a brake pad against a friction partner or disengaging a clutch.

To apply a pressurized hydraulic fluid to the hydraulic actuation member, the actuation member is connected to a master mounting through a pressure line. The master mounting can be operated by a hand lever or a foot pedal, for example. In some exemplary embodiments of the disclosure, the master mounting is attached to the handlebar tube of a vehicle steered by handlebars and is operated through a hand lever by a user of the vehicle. In some exemplary embodiments of the disclosure, the vehicle can be a bicycle, a motorbike, a snowmobile or a quad bike.

The master mounting has a piston-cylinder pairing where a cylinder bore is formed in a housing and a piston is guided in the cylinder bore, i.e., the piston can be moved in the longitudinal direction of the cylinder. As a result, the free volume of the cylinder bore can be increased or reduced depending on the piston position, and, therefore, the hydraulic fluid flows out of the cylinder and can be pressurized in the cylinder, respectively, when a force is applied to the piston.

The disclosure proposes that, in at least one longitudinal section, the inner diameter of the cylinder is larger than the outer piston diameter. In this way, the piston can easily be inserted in the cylinder bore during the final assembly of the master mounting even if the piston is provided with a circumferential gasket that seals the piston against the cylinder wall and correspondingly forms a close fit.

So that the piston can be reliably guided in the cylinder during the operation, a sleeve is disposed in a next assembly step, at least in a segment of the longitudinal section, and the piston can be guided in the interior of the sleeve. The inner diameter of the sleeve thus corresponds substantially to the inner diameter of the cylinder. Therefore, the sleeve reduces the inner diameter in the longitudinal section to such an extent that the piston can be safely guided in the cylinder. In this way, a rapid and cost-effective final assembly of the master mounting is possible.

In some exemplary embodiments of the disclosure, a second gasket can be disposed between the front face of the sleeve and a contact surface. The second gasket seals the cylinder against the environment. This serves for preventing the leakage of hydraulic fluid and a contamination of the master mounting by the hydraulic fluid.

In some exemplary embodiments of the disclosure, the master mounting contains a compensating chamber having an interior that can be connected to the cylinder through a communication channel. The volume of the hydraulic fluid can change with increasing wear of the brake pads and/or with temperature changes. In this case, hydraulic fluid can be supplied to the compensating chamber or flow in from the compensating chamber when the communication channel between the compensating chamber and the cylinder is open. When the communication channel is closed, the hydraulic system between cylinder and actuation member is closed, and, therefore, the user can pressurize the hydraulic fluid.

In some exemplary embodiments, at least the opening of the communication channel into the cylinder can be provided with an overflow channel. This overflow channel has the effect that the gasket disposed between piston and cylinder wall does not abut against the cylinder wall in the area of the overflow channel and the hydraulic fluid can flow from the cylinder through the overflow channel into the communication channel and into the compensating chamber. Upon actuation of the piston, the latter travels over the overflow channel. As a result, the gasket between piston and cylinder abuts all-over and seals the cylinder.

In some exemplary embodiments, the housing including the cylinder can be made of a plastic material, e.g., by injection molding. In some exemplary embodiments of the disclosure, the plastic material can have a fiber reinforcement, e.g., by carbon fibers and/or glass fibers and/or aramid fibers. At least one communication channel and/or one overflow channel in the cylinder wall can likewise be made by primary forming the housing by injection molding to enable a cost-effective manufacture showing a high component quality.

In some exemplary embodiments of the disclosure, the overflow channel can be introduced into the cylinder wall as an annular groove. In this case, the groove has a depth to accommodate the gasket in the groove and still leave a gap for overflowing the hydraulic fluid between the outer surface of the gasket and the inner surface of the cylinder wall.

In other exemplary embodiments of the disclosure, the overflow channel can only be formed in a narrow angular range around the opening of the communication channel, and, therefore, the gasket abuts all-over against the cylinder wall in the major circumference part of the surface of the cylinder jacket. In this case, the cylinder wall can support the gasket such that the overflow channel is not blocked by the gasket. Due to the overflow channel, it is possible to refrain from using a follow-up disk.

In some exemplary embodiments, a first gasket can be disposed between piston and cylinder. The first gasket can be disposed on the piston or the piston can carry the first gasket. As a result, the pressure building up in the cylinder upon actuation of the master mounting is kept away from the second gasket and/or the sleeve, and, therefore, the mechanical attachment of the sleeve can have smaller dimensions. This serves for simplifying the assembly of the sleeve.

In some exemplary embodiments of the disclosure, the first gasket can be an X-type gasket. In other exemplary embodiments of the disclosure, the first gasket can be a lip seal ring. On one hand, the first gasket takes care that piston and cylinder are sealingly connected to one another so as to displace the hydraulic fluid in the cylinder or pressurize it when a force is applied to the piston. On the other hand, the first gasket prevents the hydraulic fluid from escaping on the rear side of the piston thus contaminating the master mounting or the environment.

In some exemplary embodiments of the disclosure, the sleeve can have an external thread and can be screwed into an internal thread in the housing of the master mounting. This renders possible a simple and reliable assembly because the sleeve needs only to be screwed rearward into the cylinder bore after introducing the piston into the cylinder opening and, in some embodiments, the force acting on the second gasket can be adjusted by the tightening torque of the sleeve. If the thread pairing is provided with a protection, e.g., a locking varnish or an adhesive, an unintended loosening of the sleeve is reliably prevented.

In some exemplary embodiments of the disclosure, the sleeve forms a press fit in the bore in the master mounting housing. This further facilitates the assembly because the sleeve must only be attached to and pressed into the bore in straight fashion after introducing the piston into the cylinder. This leads to a reliable connection that cannot be detached by accident and that can be mounted rapidly and in cost-effective fashion. The force exerted on the second gasket can be adjusted by the pressing-in depth of the sleeve.

In some exemplary embodiments of the disclosure, the sleeve is inserted in a bore in the master mounting housing where it is fixed by a safety bolt. This exemplary embodiment allows for a likewise rapid assembly and can be reversibly detached, e.g., to carry out maintenance work or exchange damaged parts of the master mounting.

In some exemplary embodiments of the disclosure, the sleeve can be inserted in a bore in the master mounting housing where it can be fixed by a segment of a cover of the compensating chamber. This exemplary embodiment of the disclosure, too, can rapidly be disassembled to do maintenance work to readily exchange damaged parts of the piston-cylinder pairing. However, an additional safety bolt can be dispensed with when another housing part, e.g., a segment of a cover of the compensating chamber, is disposed above the cylinder bore such that the sleeve is locked in positive engagement and cannot fall out of the bore unintendedly. Such an exemplary embodiment can be assembled more easily because an additional safety bolt is omitted, and it also can be more reliable because the housing cover is usually fixed by several bolts and the malfunction of a bolt connection cannot result in a loss of the sleeve and, thus, a breakdown of the primary unit.

In some exemplary embodiments of the disclosure, the sleeve has a stop face against which the piston can be pushed by a compression spring. In this case, the subsequently described termination element is an integral part of the sleeve. In this way, the sleeve defines the outermost position of the piston and/or a rest position of the master mounting, where the volume of the cylinder is at a maximum and no pressure is applied to the hydraulic fluid. By moving the sleeve along the longitudinal extension of the cylinder bore, e.g., by screwing-in a sleeve provided with an external thread or by pressing-in the sleeve more deeply, the maximum rest position can be adjusted in accordance with the intended use. At the same time, the described embodiment prevents the piston from being lost and the master mounting from losing its function as long as the sleeve is in its intended position.

In some exemplary embodiments of the disclosure, the stop face against which the piston can be pushed by a compression spring is discontinued along the circumference thereof by at least one recess. As a result, contaminations can be removed through the rear area of the piston. Furthermore, the force that can be produced by a hand lever can be transmitted to the piston through a pressure piece in some exemplary embodiments of the disclosure, wherein the pressure piece can engage the recesses.

In some exemplary embodiments of the disclosure, the force that can be produced by a hand lever can be transmitted to the piston by a pressure piece, wherein a leg spring is disposed between the pressure piece and the housing. This embodiment permits a handle width adjustment by changing the distance of the hand lever relative to the pressure piece. In this way, the master mounting can be adapted universally for users having large or small hands. To counter the returning piston with a reduced resisting force when the force exerted on the hand lever is released, the pressure piece is moved into the rest position by a spring. The use of a leg spring here enables a compact design, and, therefore, the master mounting can be made with an altogether smaller and more compact design.

With the foregoing and other objects in view, there is provided, a master mounting for a hydraulic actuation member including a piston and a housing defining a compensating chamber having an interior, a cylinder having a cylinder wall, the piston being guided in the cylinder, a communication channel having an opening in the cylinder wall and connecting the cylinder and the compensating chamber in at least one position of the piston and at least one overflow channel disposed at least at the opening of the communication channel in the cylinder wall.

With the objects in view, there is also provided, in a vehicle guided by handlebars, a master mounting for a hydraulic actuation member comprises a piston and a housing to be connected to the handlebars and defining a compensating chamber having an interior, a cylinder having a cylinder wall, the piston being guided in the cylinder, a communication channel having an opening in the cylinder wall and connecting the cylinder and the compensating chamber in at least one position of the piston, and at least one overflow channel disposed at least at the opening of the communication channel in the cylinder wall.

In accordance with another feature, the piston has an outer diameter, the cylinder has an inner diameter, at least one longitudinal section of the inner diameter of the cylinder is larger than the outer diameter of the piston, a sleeve is disposed in the longitudinal section and has an interior, and the piston is guided in the interior of the sleeve.

In accordance with a further feature, the housing has a contact surface, the sleeve has a front face, and which further comprises a gasket disposed between the front face of the sleeve and the contact surface of the housing.

In accordance with an added feature, the cylinder wall has a circumference and the at least one overflow channel only extends over a segment of the circumference of the cylinder wall.

In accordance with an additional feature, there is provided a first gasket disposed between the piston and the cylinder or a first gasket carried by the piston.

In accordance with yet another feature, the sleeve has an external thread and is screwed into an internal thread in the housing, the sleeve forms a press fit in a bore in the housing, the sleeve is inserted in a bore in the housing where the sleeve is fixed by a safety bolt, or the sleeve is inserted in a bore in the housing where the sleeve is fixed by a segment of a cover of the compensating chamber.

In accordance with yet a further feature, there is provided a compression spring, the sleeve having a stop against which the piston is pushed by the compression spring.

In accordance with yet an added feature, there is provided a compression spring and a termination element that carries at least one first stop element having a contact surface against which the piston is pushed by the compression spring.

In accordance with yet an additional feature, the termination element has at least two protruding first stop elements spaced apart by intermediate spaces.

In accordance with again another feature, at least one of the termination element and the sleeve is attached to the housing by a screw connection.

In accordance with again a further feature, there is provided a pressure piece transmitting a force produced by a hand lever to the piston and a leg spring disposed between the pressure piece and the housing.

In accordance with again an added feature, there is provided a pressure piece, a hand lever pivotally mounted to the housing and, when moved, producing a force to the piston through the pressure piece, and a leg spring disposed between the pressure piece and the housing.

In accordance with again an additional feature, the piston has a rest position and there is provided an eccentric pin adjusting the rest position of the piston, forming an adjustable stop for the pressure piece, and having a second stop member at the housing, the second stop member limiting the adjustment area such that, in the rest position of the piston, the interior of the compensating chamber is connected to the cylinder through the communication channel.

In accordance with still another feature, there is provided a cover and a bellows within the compensating chamber and closed therein by the cover.

In accordance with still a further feature, the bellows has at least one bulge at an end abutting against the housing.

In accordance with still an added feature, the bellows has an interior side and is made in fold-free fashion at least on the interior side.

In accordance with still an additional feature, the bellows is of a transparent or translucent material.

In accordance with still an additional feature, the bellows is of an opaque material.

In accordance with a concomitant feature, the cover is at least partially transparent or translucent.

The invention shall be explained in more detail below by means of drawings without limiting the general inventive concept.

Although the systems and methods are illustrated and described herein as embodied in a master mounting for a hydraulic actuation member having a cylinder and a piston guided in the cylinder, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the systems and methods in virtually any appropriately detailed structure. Further, the terms and phrases used herein are not intended to be limiting; but rather, to provide an understandable description of the systems and methods. While the specification concludes with claims defining the systems and methods of the invention that are regarded as novel, it is believed that the systems and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems and methods. Advantages of embodiments of the systems and methods will be apparent from the following detailed description of the exemplary embodiments thereof, which description should be considered in conjunction with the accompanying drawings in which.

DETAILED DESCRIPTION OF THE EMBODIMENTS

Figure 4:
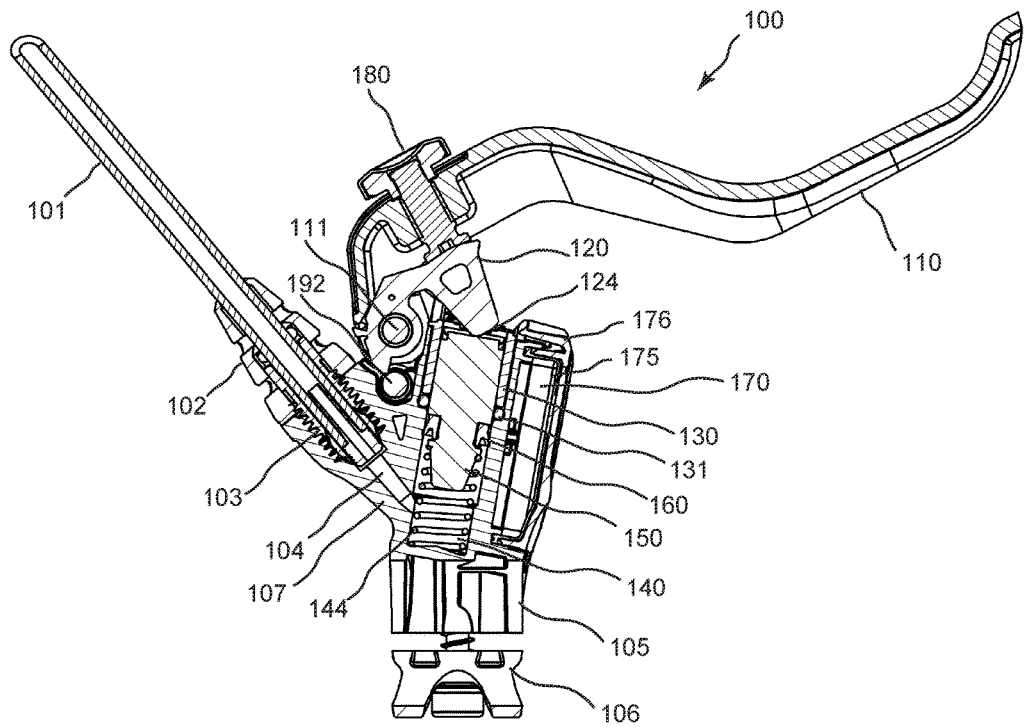
FIG. 4 is a vertical cross-sectional view of the master mounting of FIG. 1.

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, and top/bottom. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 to 7 and 10 to 12, there is shown a first exemplary embodiment of a master mounting for a hydraulic bicycle disk brake. The use shall here only be understood to be exemplary. In other exemplary embodiments of the disclosure, the master mounting can also be used for other hydraulic actuation members, e.g., for bicycle rim brakes or a brake or clutch actuation of a motor-driven vehicle or a pedelec or an e-bike.

The master mounting 100 has a hand lever 110 and a pressure piece 120, each rotatably mounted on a housing 107 by a bearing pin 111. The hand lever 110 is rotatably mounted about the bearing pin 111. The pressure piece 120 is rotatably mounted about the bearing pin 111.

The master mounting 100 has a housing portion 105 that is substantially complementary to the handlebar tube of a vehicle steered by handlebars to attach the housing 107 of the master mounting 100 to the handlebar tube by the gripper clamp 106.

A hydraulic line 101 is attached in fluid-tight fashion to the housing 107 by a screw connection 103 and a cover cap 102, and, therefore, the hydraulic fluid cannot leave the juncture between the hydraulic line 101 and the housing at ordinary operating pressure. A hydraulic actuation member is attached to the other end of the hydraulic line 101 by at least one slave cylinder, e.g., a brake caliper.

A cylinder bore 140 is provided in the housing 107. The cylinder bore 140 can be produced in the housing 107 by a machining operation or when the housing 107 is made by primary forming, for example. A cast metal method, a drop forge method. or, if the housing 107 is made of a plastic material, an injection molding method, for example, is suitable for primary forming the housing 107. A plastic material used for the housing 107 can have a fiber reinforcement that can be also inserted during the injection molding of the housing 107, for example.

A piston 150 is slidably supported in the cylinder 140 so that, when the piston is moved, the free volume of the cylinder bore 140 is increased or reduced. A return spring 144 is additionally disposed in the cylinder 140 and serves for moving the piston into an initial or rest position where the volume of the cylinder 140 is at a maximum. The volume of the cylinder 140 corresponds with a line 104 formed in the housing, and, therefore, hydraulic fluid can flow from the cylinder 140 through the line 104 into the line 101.

The pressure piece 120 has a piston contact surface 124 that is in contact with the piston 150 and through which the force is transmitted to the piston 150 when the hand lever 110 is actuated.

The distance between the pressure piece 120 and the hand lever 110 can be adjusted through a handle width adjustment 180. It is thus possible to adapt the distance of the hand lever 110 from the handlebar tube to the needs of the vehicle user.

The housing 107 also has a compensating chamber 170 that is cut off from the environment by a bellows 175 and a housing cover 176. The interior 172 of the compensating chamber 170 corresponds with the cylinder 140 through a communication channel 171. Hydraulic fluid can, thus, be conveyed from the compensating chamber 170 into the cylinder 140, e.g., when the hydraulic fluid cools down or when the rest position of the slave piston is changed due to brake pad wear. If the slave piston is returned into an initial position or the temperature of the hydraulic fluid increases, hydraulic fluid can be conveyed into the compensating chamber 170 through the communication channel 171. As evident in FIG. 6, a first gasket 160 is disposed between the piston 150 and the wall of the cylinder 140 and is made as a lip seal ring in the exemplary embodiment shown. When the piston 150 is moved, the lip seal ring slides along the cylinder wall and seals the latter to build up a pressure in the cylinder 140. When the piston 150 returns into the rest position shown in FIG. 6, the lip seal ring does not abut against the cylinder wall, at least section-wise, and, therefore, hydraulic fluid can flow through an overflow channel 173 and past the lip seal ring into the communication channel 171.

Figure 5:
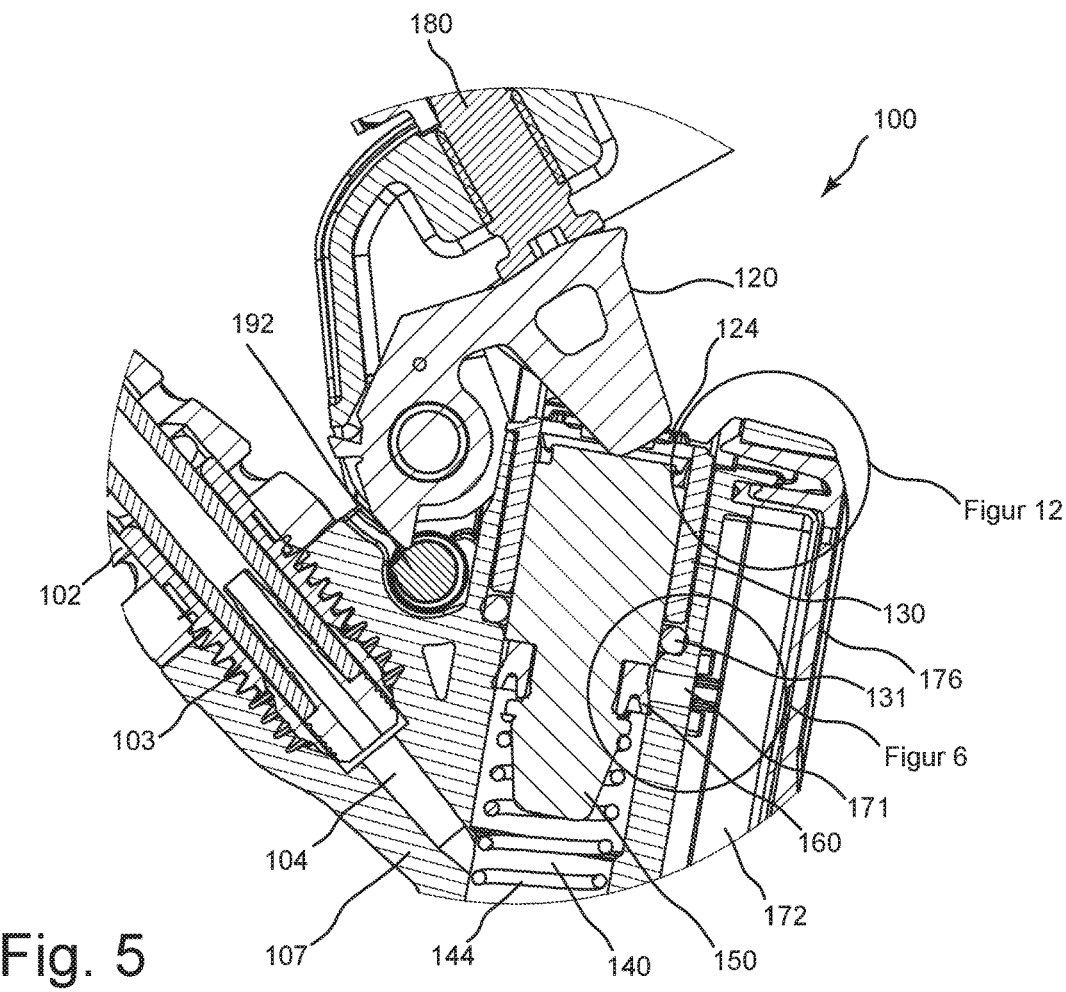
FIG. 5 is an enlarged, fragmentary, cross-sectional view of a portion of the master mounting of FIG. 4.

As is best seen from FIG. 5, the cylinder bore 140 has a longitudinal section that has a larger diameter compared to the outer diameter of the piston 150. A sleeve 130 is inserted in this longitudinal section and cuts off the cylinder bore 140 to the top and has an inner diameter where the piston 150 can be guided or that corresponds approximately to the inner diameter of the cylinder 140. Therefore, the piston 150 can be inserted in the cylinder bore 150 from the rear side in the final assembly of the master mounting and the cylinder bore can subsequently be closed by the sleeve 130.

Figure 6:
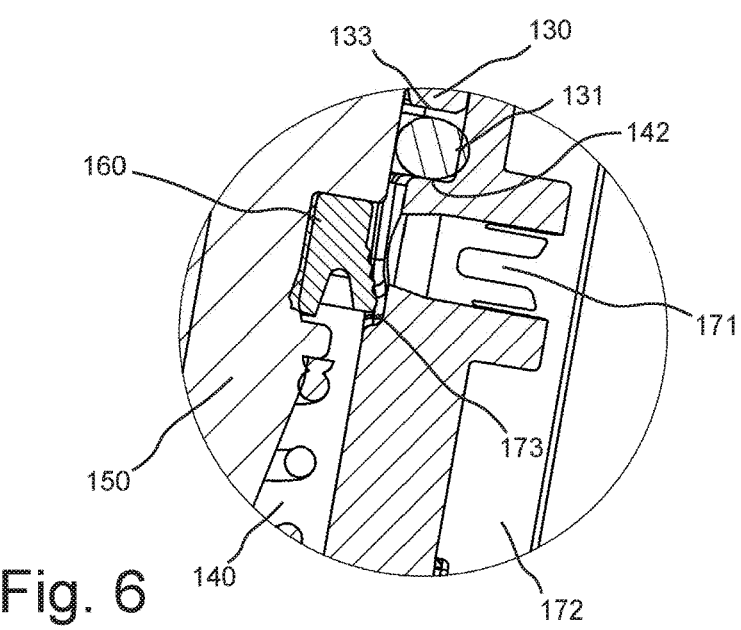
FIG. 6 is an enlarged, fragmentary, cross-sectional view of a portion of the master mounting of FIG. 5.
Figure 7:
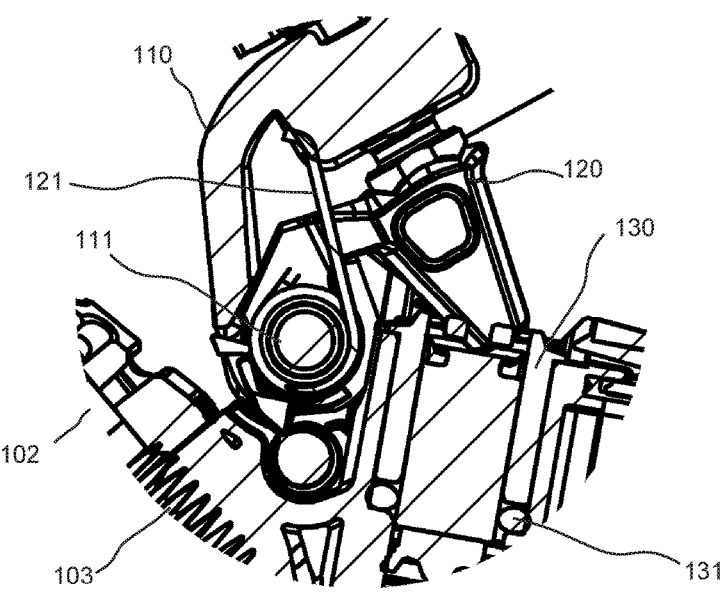
FIG. 7 is an enlarged, fragmentary, cross-sectional view of a portion of the master mounting of FIG. 1 in another sectional plane.
Figure 8:
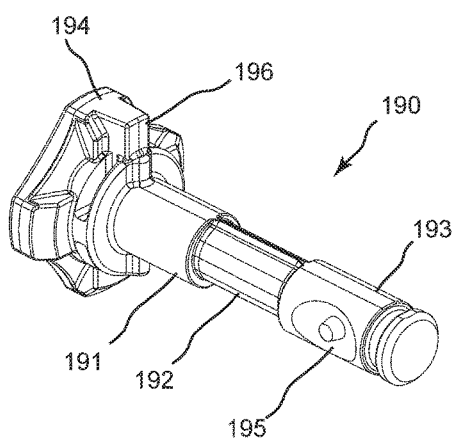
FIG. 8 is a perspective view of a pin of an exemplary embodiment of a pressure point adjustment of a master mounting.
Figure 9:
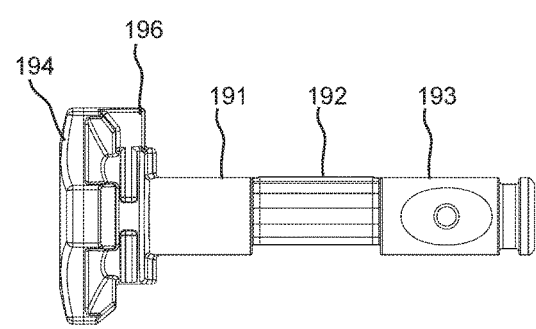
FIG. 9 is a side elevational view of the pin of FIG. 8.
Figure 10:
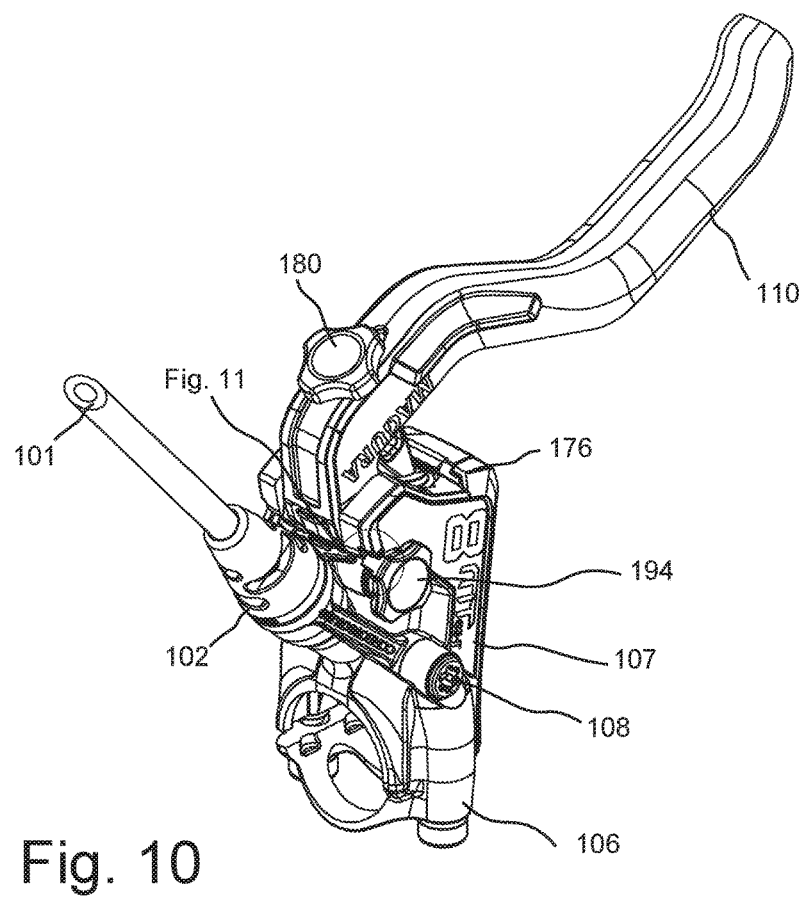
FIG. 10 is a perspective view of the master mounting of FIG. 1.

FIG. 6 likewise shows a second gasket 131 that is disposed between a front face 133 of the sleeve 130 and a contact surface 142 in the cylinder wall. An axial force can be applied to the second gasket 131 by the sleeve 130 to deform the gasket 131, which is an O-ring gasket in the exemplary embodiment shown. As a result, the gasket 131 reliably abuts against the piston wall and the cylinder wall. The second gasket 131 prevents hydraulic fluid from escaping into the environment.

Figure 12:
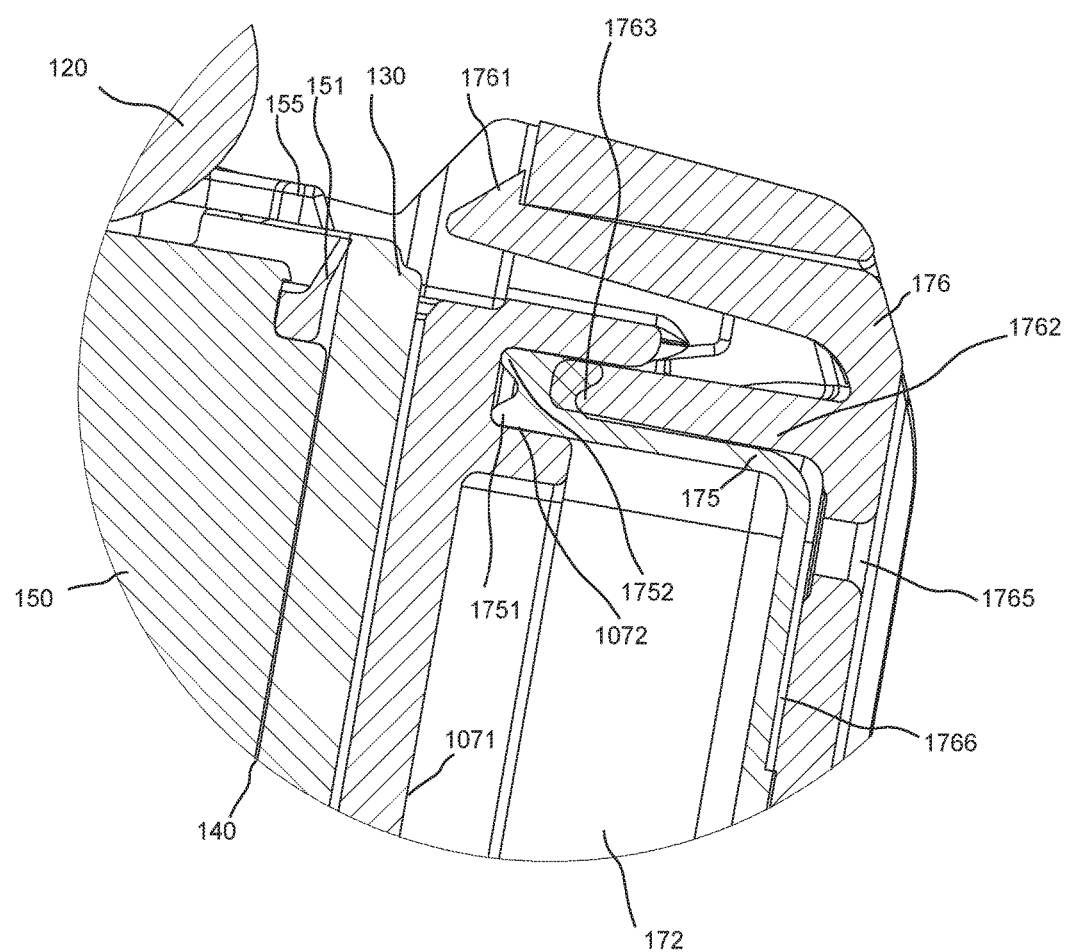
FIG. 12 is an enlarged, fragmentary, cross-sectional view of a portion of the master mounting of FIG. 5.
Figure 15:
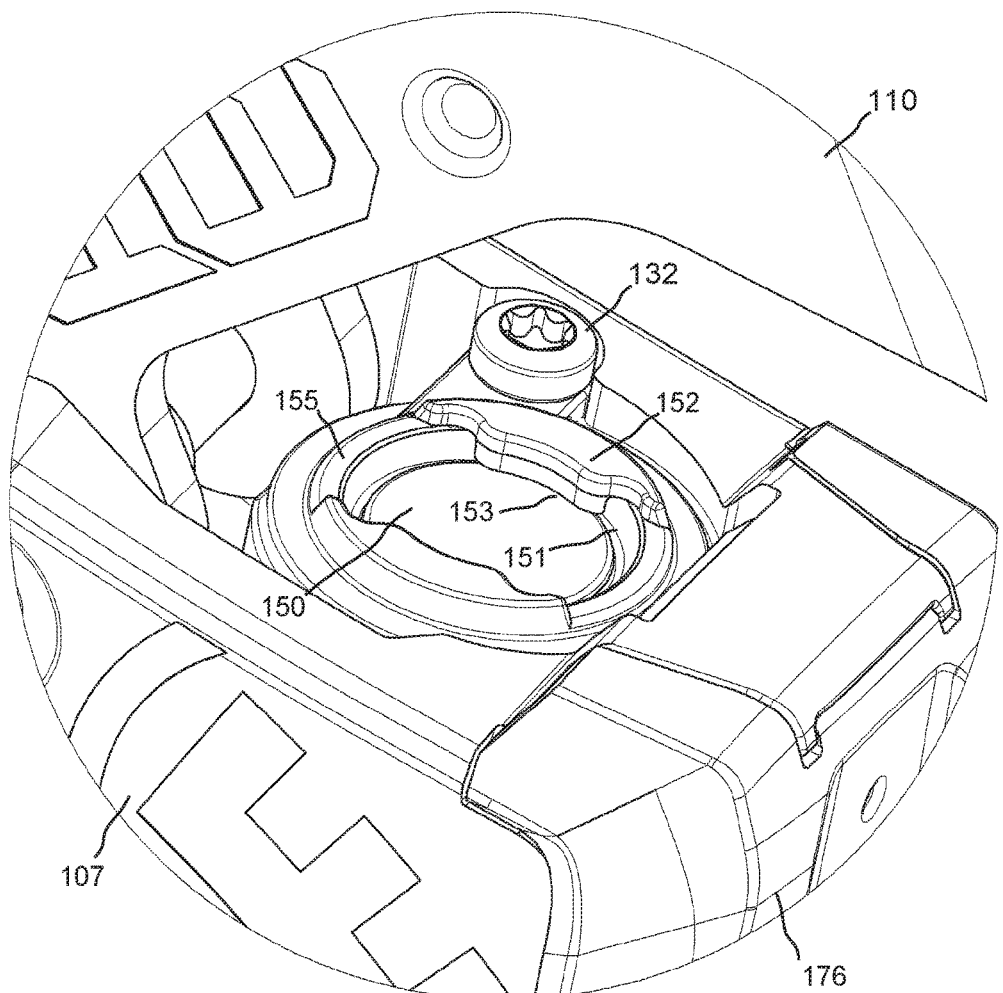
FIG. 15 is an enlarged, fragmentary, perspective view of the master mounting of FIG. 2.

Finally, FIGS. 12 and 15 show a scraper 151. In some exemplary embodiments of the disclosure, the scraper 151 is adapted to avoid the penetration of dust and dirt into the piston-cylinder pairing. In some exemplary embodiments of the disclosure, the scraper can alternatively or additionally prevent the leakage of hydraulic fluid, and, therefore, no hydraulic fluid escapes from the rear end of the piston 150 even if small leakages occur on the first gasket 160. The scraper 151 can be clipped to the piston 150 by a positive locking mechanism or can be connected to the piston by a press fit. In some exemplary embodiments of the disclosure, a welded or adhesive joint can be used between the scraper 151 and the piston 150.

Figure 2:
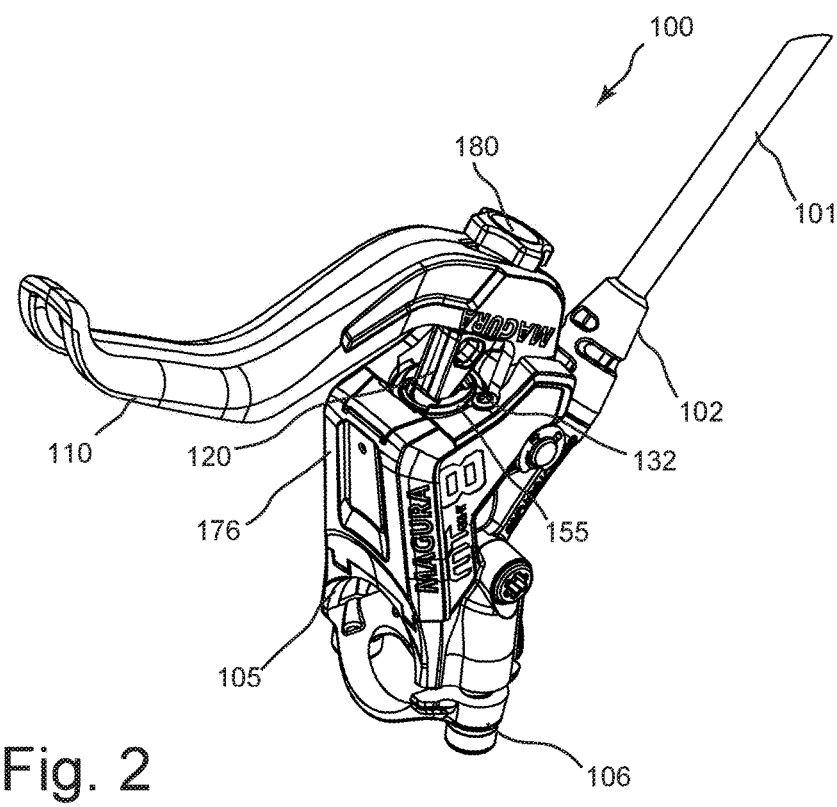
FIG. 2 is a perspective view of the master mounting of FIG. 1.
Figure 3:
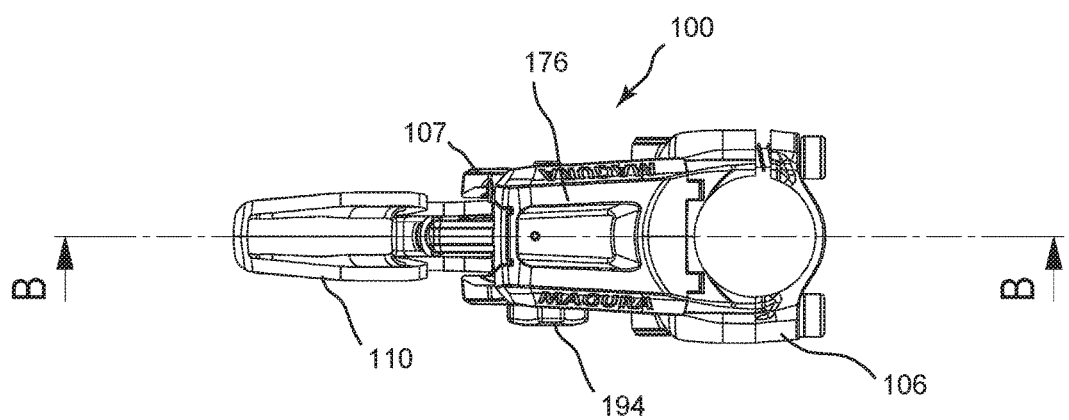
FIG. 3 is a bottom plan view of the master mounting of FIG. 1.

Furthermore, the figures illustrate a termination element 155 that is shown in FIGS. 2, 12, and 15. The termination element 155 has an approximately annular base body. The base body can have a diameter that allows an assembly within the sleeve 130. In other exemplary embodiments of the disclosure, the diameter of the termination element 155 can be larger, and, therefore, the sleeve 130 can also be fixed by the termination element 155. In yet another exemplary embodiment, the termination element 155 can be an integral component of the sleeve 130. In the exemplary embodiment shown, the termination element 155 is held by a fastening screw 132 which is shown in FIGS. 2 and 15.

In the exemplary embodiment shown, the termination element 155 carries two protruding, first stop elements 152. In some exemplary embodiments of the disclosure, the first stop elements 152 form the end stop of the piston 150 to prevent the latter from falling out of the bore. In the outermost end position, a subarea of the front side of the piston 150 abuts against the contact surfaces 153 of the first stop elements 152.

In some embodiments, a single first stop element 155 can be available which then covers a relatively large section of the circumference of the termination element. The embodiment which is shown in the drawings and has two approximately opposite first stop elements has the advantage that the pressure piece 120 can be immersed into the two intermediate spaces between the first stop elements 152 to press the piston into the bore against the spring force upon actuation of the hand lever. Furthermore, dirt entering can be removed via the two intermediate spaces between the first stop elements 152, and therefore this dirt cannot accumulate on the contact surfaces 153.

In some exemplary embodiments of the disclosure, the scraper 151 can be accommodated in an undercut of the sleeve 130 in the end position of the piston 150. As a result, the installation space can be reduced.

The function of the compensating chamber is explained with reference to FIG. 12. The interior 172 of the compensating chamber is confined by a boundary surface 1071 of the housing 107 at least on one side, i.e., on the side facing the cylinder bore 140. The side of the interior 172, which faces the boundary surface 1071, is confined by the bellows 175.

In some exemplary embodiments, the bellows 175 can comprise an elastomer or contain an elastomer, e.g., EPDM. In other exemplary embodiments of the disclosure, the bellows 175 can comprise silicone. In any case, the bellows 175 is made of a resilient material, and, therefore, the volume can be reduced by deformation of the bellows 175 when the volume of the hydraulic fluid in the interior 172 is reduced and the volume can be increased by a bulge of the bellows 175 when the amount of the hydraulic fluid in the interior 172 is increased. In some exemplary embodiments of the disclosure, a gap 1766 may be present between the cover 176 and the bellows 175 for this purpose, and, therefore, an increase in volume is still possible, e.g., by thermal expansion of the hydraulic fluid, even if the interior 172 is filled to a maximum, e.g., in the case of brand-new master mountings and maximum brake pad thicknesses. To enable a pressure compensation in the gap 1766 when the volume of the interior 172 is changed, the cover 176 can be provided with a vent hole 1765.

In the described exemplary embodiment, the bellows 175 distinguishes itself in that it has no folds, at least on the boundary surfaces facing the interior 172. The bellows 175 rather has a largely smooth surface, wherein a change in volume is only obtained by a deformation of the bellows 175. As a result, the volume of the interior 172 that is provided can be increased while the available space of the primary unit remains the same, because the effective wall thickness of the smooth-surface bellows 175 is smaller compared to a corrugated bellows or an air spring bellows. In addition, the aeration of the interior 172 can be facilitated because bags are often formed in the folds of a corrugated bellows and air bubbles can only escape with difficulty from such bags.

FIG. 12 also shows that the cover 176 is attached to the housing 107 by a snap-on connection. This facilitates the assembly of the master mounting because no screw connection has to be produced in a time-consuming way. It is rather sufficient to place the bellows 175 into the associated groove 1072 of the boundary surface 1071 and press the cover 176 thereon in a subsequent operating step to lock it. For this purpose, at least one locking element 1761 is available and can form an integral part of the cover 176. The locking element 1761 comprises in a generally known way of a cantilever, at the end of which a head having a sliding surface is disposed. When the cover 167 is pressed on, the sliding surface slips off the housing 107, thus producing a deflecting moment on the cantilever so as to deform the latter in a resilient way. When the contact surface of the locking element 1761 has passed the contact surface of the housing 107, the cantilever springs back into its initial position to adopt the end position of the locking element 1761, which is shown in FIG. 12.

To enable a fluid-tight closure of the interior 172 after locking the cover 167, the bellows 175 is provided with two bead-like bulges 1751 and 1752. The bulges 1751 and 1752 abut against the bottom of the groove 1072. The bulges 1751 and 1752 form two sealing points or sealing planes in the bottom of groove 1072. For this purpose, a contact pressure is applied to the bulges 1751 and 1752 towards the groove bottom by a web 1762 when the master mounting is operated. The web 1762 can also be an integral part of the cover 176 and can be attached when the cover 176 is primary formed, e.g., by the injection molding process. A bead-like bulge 1763 can also be present on the end of the web 1762, which faces the groove 1072. In cooperation with the bellows 175, the bulge 1763 forms a third sealing point. The part of the bellows 175, which is accommodated in the groove 1072, can have a material thickness of over 0.8 mm, more than 1.0 mm, or more than 1.5 mm. As a result, a resilient restoring force is exerted on the cover 176 through the web 1762 to fix the locking element 1761 in secure fashion. Furthermore, the material of the bellows 175 can flow plastically in the area of the groove 1072 to seal the interior 172 in a particularly good fashion.

The mode of operation of a pressure point adjustment is explained with regard to FIG. 4 and FIGS. 8 to 11. The pressure point adjustment has a pin 190 having a control knob 194 by which the pin 190 can be turned into a desired position by the user. In addition, a second stop element 196 is disposed on the control knob 194, the function of which is explained by FIGS. 10 and 11.

The shaft of the pin 190 has three longitudinal sections 191, 192 and 193. The longitudinal sections 191 and 193 are, here, made as support surfaces that are part of a plain bearing and by which the pin 190 abuts against the housing 107 of the primary unit and can be rotated in the housing 107. In the third longitudinal section 193, a cast-on section 195 is disposed and can be formed by injection molding when the pin 190 is made. In other exemplary embodiments of the disclosure, the cast-on section 195 can also be disposed in another spot of the pin 190, can have another shape, or can be totally omitted. The cast-on section 195 is not essential for the function of the pin 190.

An eccentrically supported longitudinal section 192 is disposed between the first longitudinal section 191 and the third longitudinal section 193. The pressure piece 120 is supported on the eccentric second longitudinal section 192 to change the rest position of the pressure piece 120 through the adjustment wheel 194 when the pin 190 is rotated. The rest position, i.e., the axial position of the piston 150 in the cylinder 140, thus changes through the contact surface 124 depending on the position of the pin 190.

The contact surface or the second longitudinal section 192 of the pin 190 can be polygonal or round to obtain an infinitely variable or stepped adjustment of the pressure point.

In the case of the pressure-point adjustment, the handle width is simultaneously adjusted. Because the handle width can be adjusted with the handle width adjustment 180 independently of the pressure point, an adjustment of the handle width can be compensated for when the pressure point is adjusted with the handle width adjustment 180.

As evident by FIG. 6, the piston 150 can be moved into the cylinder 140 when the bolt 190 is adjusted in its rest position to such an extent that the connection between the compensating chamber 170 and the cylinder 140 is interrupted. As a result, the open hydraulic system operates as a closed hydraulic system. This is usually to be avoided in the case of open hydraulic systems. Therefore, the pin 190 can have a second stop element 196 that is supported on the housing 107 as evident by FIG. 11. As a result, the adjustment area of the pressure pump adjustment can be limited to such an extent that an unintended travel over the overflow channel 173 is avoided.

Figure 11:
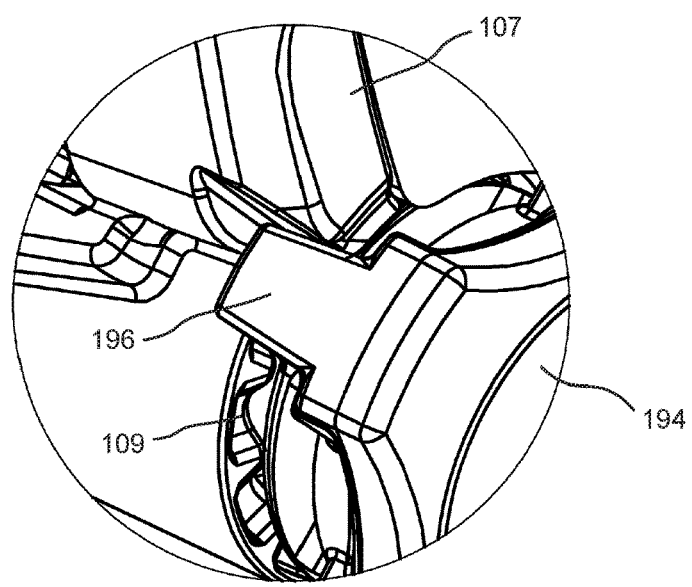
FIG. 11 is an enlarged, fragmentary, perspective view of a portion of the master mounting of FIG. 10.

Furthermore, FIG. 11 shows optional locking elements 109, into which the pin 190 can lock to avoid an undesired misalignment, e.g., by vibrations. The relative orientation of the locking elements 109 and the second stop element 196 can be made such that, when the second stop element 196 abuts against the housing 107, the pin 190 is always returned into a locking step where the second stop element 196 is not in contact with the housing 107. If the overflow channel 173 is closed by the gasket 160 when the second stop element 196 abuts against the housing 107, the returning into the nearest locking step can lead to the fact that the piston 150 returns to such an extent that the overflow channel 173 is open again.

Figure 13:
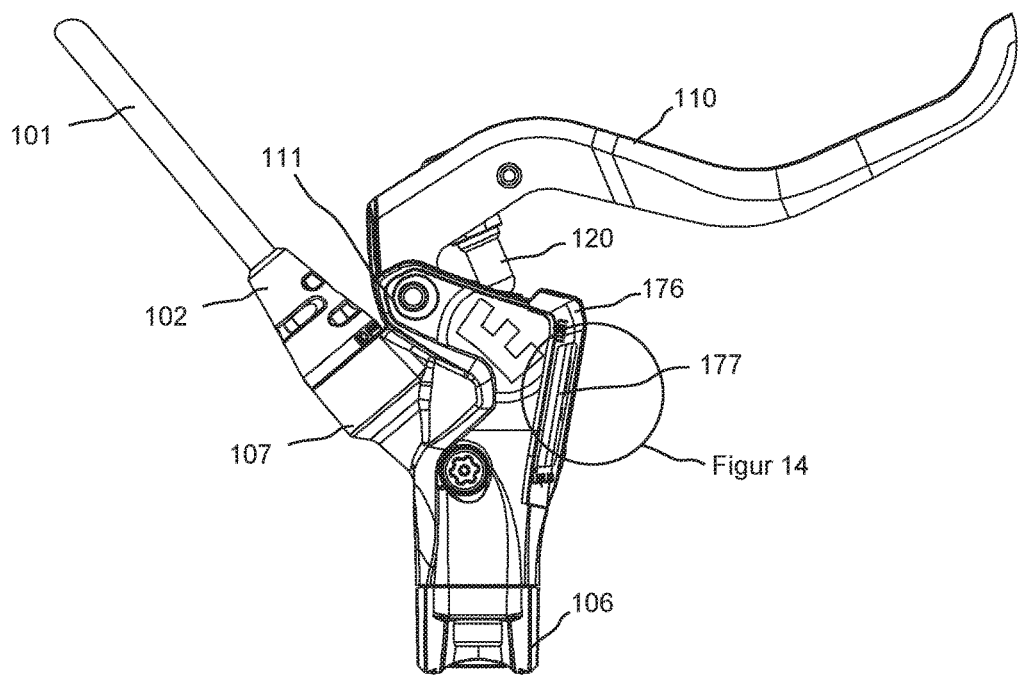
FIG. 13 is a side elevational view of a second exemplary embodiment of a master mounting.
Figure 14:
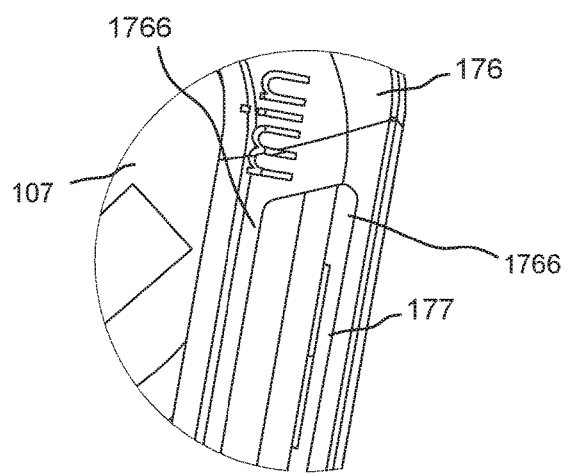
FIG. 14 is an enlarged, fragmentary, side elevational view of a portion of the master mounting of FIG. 13.

A second exemplary embodiment of the disclosure is specified by FIGS. 13 and 14. Equal components are designated by equal reference signs, and, therefore, the below description is limited to the differences with respect to the above described first exemplary embodiment of the disclosure.

Figure 1:
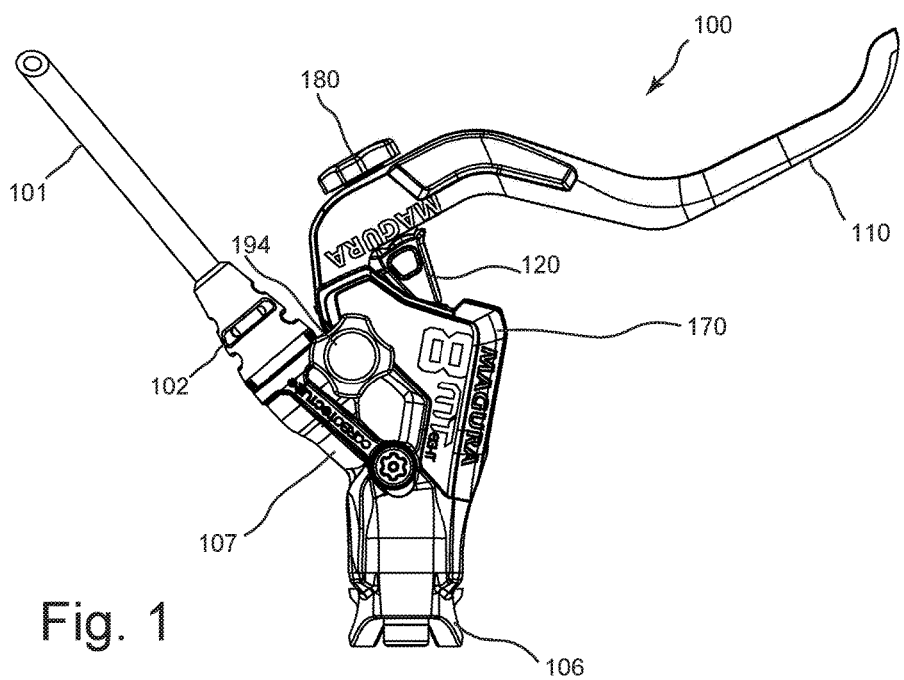
FIG. 1 is a fragmentary side elevational view of a first exemplary embodiment of a master mounting.

On the basis of the first embodiment illustrated in FIG. 1, the embodiment according to FIG. 13 differs in that the cover 176 has an observation window 177. The observation window 177 enables a view into the compensating chamber 170. As a result, the liquid level of the hydraulic fluid in the compensating chamber 170 can be monitored by the user of the vehicle steered by handlebars in a particularly simple way. The liquid level can drop, for example, when the brake pads continue to wear and the volume of the slave cylinder is enlarged in the rest position by a readjustment of the pad. The liquid level can also drop in the compensating chamber 170 when the master cylinder, the slave cylinder, or the hydraulic line 101 starts leaking and hydraulic fluid escapes. Because such damage can result in a total failure of the hydraulic actuation member, it is desirable for the user to detect such a damage at an early stage.

As is evident from FIG. 14, the observation window 177 enables the assessment of the dimensions of gap 1766. If the bellows 175 is made of an opaque material, e.g., a black elastomer, the observation window 177 can appear to be completely black in some exemplary embodiments of the disclosure when the interior 172 is fully filled with hydraulic fluid because the observation window is fully filled by the bellows 175. When the volume of the hydraulic fluid drops in the interior 172, the outer surface of the bellows 175 approaches the inner boundary surface 1701 to enlarge the gap 1766. This can be seen in the observation window 177 because it is no longer the entire area of the observation window 177 that appears to be black. In some exemplary embodiments of the disclosure, the observation window can have a minimum marking that defines the minimum volume of the interior 172 and, thus, the minimum filling volume with the hydraulic fluid. In other exemplary embodiments of the disclosure, the minimum marking can be given by the width of the observation window 177 to achieve the minimum volume of the interior 172 when the observation window 177 is fully free or when the bellows 175 is no longer visible in the observation window 177.

The principle explained by FIGS. 13 and 14 can, of course, be varied as well. For example, the cover 176 can be fully transparent, and, therefore, a separate observation window 177 is omitted or the observation window 177 adopts the entire area of the cover 176.

In some exemplary embodiments of the disclosure, the bellows 175 can be made of a transparent or translucent material, e.g., a silicone. In such a case, the observation window 177 does not only enable the assessment of the gap 1766, but also a direct view onto the hydraulic fluid. As a result, it is possible to evaluate the filling level and also the quality of the hydraulic fluid in some exemplary embodiments of the disclosure. This enables the detection of a turbidity caused by wear or of enclosed air bubbles, for example. As a result, the user can identify a time of a necessary aeration. This serves for increasing the operational reliability.

Of course, the invention is not limited to the embodiments shown in the figures. The above description should not be considered to be limiting but explanatory. Features from different, above specified exemplary embodiments of the disclosure can be combined into further embodiments. The below claims should be comprehended so that a feature stated is present in at least one exemplary embodiment of the disclosure. This does not rule out the presence of further features. If the claims and the above description define "first" and "second" features, this designation serves for distinguishing two similar features without determining an order.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or configuration. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

What is claimed is:

1. A master mounting for a hydraulic actuation member, comprising:
    a piston;
    a housing defining:
        a compensating chamber having an interior;
        a cylinder having a cylinder wall, the piston being guided in the cylinder;
        a communication channel having an opening in the cylinder wall and connecting the cylinder and the compensating chamber in at least one position of the piston; and
        at least one overflow channel disposed at least at the opening of the communication channel in the cylinder wall; and
    a gasket having an outer surface and being disposed between the piston and the cylinder,
    wherein the at least one overflow channel forms a recess in the cylinder wall and has a depth to accommodate the gasket in the recess and still leave a gap for overflow of fluid between the outer surface of the gasket and the cylinder wall.

2. The master mounting according to claim 1, wherein:
    the piston has an outer diameter;
    the cylinder has an inner diameter;
    at least one longitudinal section of the inner diameter of the cylinder is larger than the outer diameter of the piston;
    a sleeve is disposed in the longitudinal section and has an interior; and
    the piston is guided in the interior of the sleeve.

3. The master mounting according to claim 2, wherein the housing has a contact surface, the sleeve has a front face, and which further comprises a gasket disposed between the front face of the sleeve and the contact surface of the housing.

4. The master mounting according to claim 2, wherein one of:
    the sleeve has an external thread and is screwed into an internal thread in the housing;
    the sleeve forms a press fit in a bore in the housing;
    the sleeve is inserted in a bore in the housing where the sleeve is fixed by a safety bolt; and
    the sleeve is inserted in a bore in the housing where the sleeve is fixed by a segment of a cover of the compensating chamber.

5. The master mounting according to claim 2, which further comprises a compression spring, the sleeve having a stop against which the piston is pushed by the compression spring.

6. The master mounting according to claim 2, which further comprises:
    a compression spring; and
    a termination element that carries at least one first stop element having a contact surface against which the piston is pushed by the compression spring.

7. The master mounting according to claim 6, wherein the termination element has at least two protruding first stop elements spaced apart by intermediate spaces.

8. The master mounting according to claim 6, wherein at least one of the termination element and the sleeve is attached to the housing by a screw connection.

9. The master mounting according to claim 1, wherein:
    the cylinder wall has a circumference; and
    the at least one overflow channel only extends over a segment of the circumference of the cylinder wall.

10. The master mounting according to claim 1, which further comprises:
    a pressure piece transmitting a force produced by a hand lever to the piston; and
    a leg spring disposed between the pressure piece and the housing.

11. The master mounting according to claim 1, which further comprises:
    a pressure piece;
    a hand lever pivotally mounted to the housing and, when moved, producing a force to the piston through the pressure piece; and
    a leg spring disposed between the pressure piece and the housing.

12. The master mounting according to claim 11, wherein the piston has a rest position and which further comprises an eccentric pin:
    adjusting the rest position of the piston;
    forming an adjustable stop for the pressure piece; and
    having a second stop member at the housing, the second stop member limiting an adjustment area such that, in the rest position of the piston, the interior of the compensating chamber is connected to the cylinder through the communication channel.

13. The master mounting according to claim 1, which further comprises:
    a cover; and
    a bellows within the compensating chamber and closed therein by the cover.

14. The master mounting according to claim 13, wherein the bellows has at least one bulge at an end abutting against the housing.

15. The master mounting according to claim 13, wherein the bellows has an interior side and is made in fold-free fashion at least on the interior side.

16. The master mounting according to claim 13, wherein the bellows is of a transparent or translucent material.

17. The master mounting according to claim 13, wherein the bellows is of an opaque material.

18. The master mounting according to claim 13, wherein the cover is at least partially transparent or translucent.

19. In a vehicle guided by handlebars, a master mounting for a hydraulic actuation member, comprising:
    a piston;
    a housing to be connected to the handlebars and defining:
        a compensating chamber having an interior;
        a cylinder having a cylinder wall, the piston being guided in the cylinder;
        a communication channel having an opening in the cylinder wall and connecting the cylinder and the compensating chamber in at least one position of the piston; and
        at least one overflow channel disposed at least at the opening of the communication channel in the cylinder wall; and
    a gasket having an outer surface and being disposed between the piston and the cylinder,
    wherein the at least one overflow channel forms a recess in the cylinder wall and has a depth to accommodate the gasket in the recess and still leave a gap for overflow of fluid between the outer surface of the gasket and the cylinder wall.

* * * * *